United States Patent
Kolokowsky

(12) 
(10) Patent No.: US 6,967,869 B1
(45) Date of Patent: Nov. 22, 2005

(54) METHOD AND DEVICE TO IMPROVE USB FLASH WRITE PERFORMANCE

(75) Inventor: Stephen Henry Kolokowsky, San Diego, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 10/898,501

(22) Filed: Jul. 22, 2004

(51) Int. Cl.[7] ............................................. G11C 16/04
(52) U.S. Cl. ............................ 365/185.11; 365/185.29; 365/230.03
(58) Field of Search ...................... 365/185.11, 230.03, 365/185.29, 218; 711/100, 103

(56) References Cited

U.S. PATENT DOCUMENTS

| | | | |
|---|---|---|---|
| 6,493,787 B1 * | 12/2002 | Yamamoto et al. | 711/100 |
| 6,724,680 B1 * | 4/2004 | Ng et al. | 365/230.03 |
| 6,898,662 B2 * | 5/2005 | Gorobets | 711/103 |

* cited by examiner

*Primary Examiner*—Son T. Dinh
(74) *Attorney, Agent, or Firm*—Marger, Johnson & McCollom PC

(57) ABSTRACT

A controller continuously or periodically interrogates the FAT table to determine which blocks are not storing data relative to any files stored in the memory at that time. If a block is located that is not allocated to a file, this block is erased and marked as being ready to receive data. In this way, a large file can be stored in the memory without having to wait for an erase operation to take place while the file is being written to the memory.

20 Claims, 5 Drawing Sheets

METHOD AND DEVICE TO IMPROVE USB FLASH WRITE PERFORMANCE

FIELD OF THE INVENTION

The present invention relates to flash memories and more particularly to flash memories connected to a system by a Universal Serial Bus (USB).

BACKGROUND OF THE INVENTION

There are a number of different kinds of flash memory; however, the present invention relates to what is generally known as NAND flash memory, and the term flash memory as used herein generally refers to NAND flash memory.

An important feature of flash memory devices is that they can maintain stored data without any external source of power. Thus, flash memory is frequently used in devices such as "thumb drives" and in digital cameras. A flash memory device can be removed from a computer or camera and the data stored in the device will not be lost.

The read operation in a flash memory is performed in a manner similar to the read operation in the older and less expensive Random Access (RAM) memories. However, the write operation in a flash memory is handled in a different manner from the way read operations are performed in RAM memories. In a RAM memory it is possible to write new data into individual memory locations that contain other data. This is not possible in a flash memory. New data cannot be written to a location in memory that already contains data. In a flash memory, a location must be erased before new data can be written to that location. Furthermore, an individual location in a flash memory can not be erased. Flash memories are divided into blocks and an erase operation is done on an entire block. Thus if data was previously stored in a block, the entire block containing a particular location must be erased before data can be written to any individual particular location within the block.

If a block of a flash memory contains data which is be preserved, prior to writing new data to a particular location in the block, any existing data in the entire block containing the particular location must be temporarily relocated. The reason for this is that the entire block must be erased in order to erase one particular location. Any existing data stored a block which one desires to preserve must be stored in some other location prior to the erase operation.

One type of widely used flash memory is called a Solid State Floppy Disk Card (SSFDC), or more commonly a SmartMedia™. The SmartMedia specifications were developed and they are maintained by the SSFDC Forum. The SmartMedia specifications are widely available. The SmartMedia specifications require that a memory must have twenty four temporary (already erased) blocks available for data storage.

With a standard SmartMedia device, there is a significant difference in the operations required to store a relatively small file (the size of which is twenty four, or less, blocks) and the operations required to store a file the size of which is larger than twenty four blocks. In order to store a file larger than twenty four blocks, one or more block erase operations must take place before the file write operation can be completed.

The following are examples that indicate the steps required for a typical write operation in a flash memory. It should be understood that these are merely examples and a wide variety of flash memory devices exist, each with its own individual characteristics.

The first example is a 'best case' situation where the file size exactly matches the flash memory block size. In most situations, this is an unlikely scenario; however, it can serve as a useful first example. In this example, no partial-block movement occurs. The memory controller merely identifies one of the empty blocks and writes the data into that block. Note that the SmartMedia specifications require that there be twenty four empty blocks available. After data storage is complete, the controller erases an unassigned block so that there will be twenty four erased blocks ready to receive data.

The second example is one where a small amount of data is being changed in a block that already contains data. This is a somewhat more realistic example. This example requires a partial-block movement operation. First the existing data which is not going to be changed is moved to one of the spare (previously erased) blocks. Next, the new data is added to the data in this block. After the storage operation is complete, the controller erases another block which is no longer assigned to a file.

The third example is an example that is particularly relevant to the present invention. In this example a file larger than the size of 24 blocks is written to the flash memory. First, the 24 spare blocks (which were previously erased) are filled with new data. Then the controller must locate other blocks that no longer have data that is being used and erase these blocks. Finally the additional data in the file is written to these newly erased blocks. Thus, the storage operation can not be completed until a relatively lengthy erase operation has been performed.

Host systems use a file allocation table (FAT) to record which logical addresses contain data related to each particular file. The present invention takes advantage of the fact that the FAT is stored in the flash memory. The FAT table indicates to the operating system which logical addresses are mapped to which files. At any particular time, any logical addresses that are not mapped to a file are not being used by any of the files stored in the memory. The memory controller maintains a table which correlates logical addresses to corresponding physical addresses.

SUMMARY OF THE INVENTION

Flash memory device generally have a limited number of blocks that have been erased and which are ready to receive data. A file allocation table (the FAT) is stored in the flash memory and it has information therein which indicates which blocks are allocated to files and which blocks are not allocated to files. With the present invention the memory controller continuously or periodically interrogates the FAT table to determine which logical addresses are not allocated to any files stored in the memory at that time. If a block of logical addresses is located that is not allocated to a file, the corresponding block of physical addresses is erased and marked as being ready to receive data. Thus a file larger than the size of the number of normally erased blocks can be stored in the memory without having to wait for an erase operation to take place before the storage operation can be completed.

BRIEF DESCRIPTION OF THE FIGURES

1) Figure one illustrates a flash memory organized according to the SmartMedia specifications.

DETAILED DESCRIPTION

Figure 1:
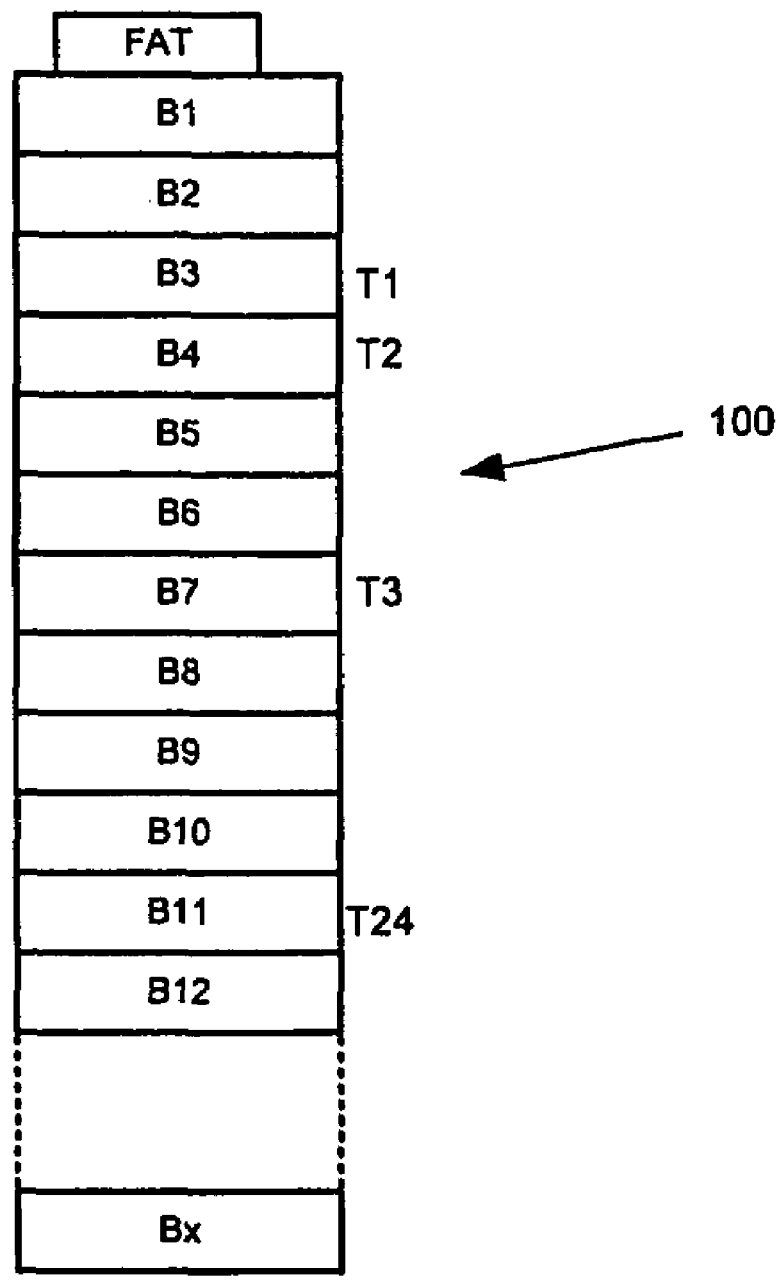

The present invention will now be described more fully with reference to the accompanying drawings. The drawings illustrate exemplary embodiments of the invention and the operation of these embodiments. This invention may, however, be embodied in many different forms and the inventions should not be construed as being limited to the embodiments set forth herein. These embodiments disclose and conveys the concept and scope of the invention to those skilled in the art. In the drawings, the size of the boxes do not represent the size of physical components. The block size in the figures is chosen merely for ease of illustration and to facilitate describing the invention. In the figures, the same reference numerals are used to denote the same elements throughout the drawings.

The invention pertains to memories that require an erase cycle before writing. A flash memory is one such type of memory. The specific embodiment described herein utilizes a Solid State Floppy Disk Card which is also known as a "SmartMedia™". However, it should be noted that other embodiments of the invention utilize other types of memory that require an erase cycle prior to writing data.

A SmartMedia card is a small flash memory card which has a physical size similar to that of a commemorative stamp. SmartMedia cards were defined by an organization known as the SSFDC forum.

The initials "SSFDC" stand for "Solid State Floppy Disk Card". In 1996 the name Solid State Floppy Disk Cards was changed to "SmartMedia". The SSFDC forum has retained the name "SSFDC forum". The SSFDC forum publishes the specification for SmartMedia flash memories. The SSFDC forum can be reached at: SSFDC Forum Bureau, C-zone, 4F, Toshiba Bldg., Tokyo, Japan.

The SmartMedia specifications define a flash memory which is divided into blocks. The specifications require that a SmartMedia memory have 24 blocks that are erased and available to store data. That is, at any time, prior to a write operation, there should be at least 24 blocks (herein designated as temporary storage blocks) that have been erased and that are ready for a write operation.

A block diagram of a SmartMedia flash memory is shown in FIG. 1. The memory is divided into blocks. The exact number of blocks in the memory and the size of each block depends upon the size of the particular memory. A variety of different size flash memory are commercially available. In FIG. 1 the memory blocks are designated B1 to Bx and the dotted lines indicate a variable number of blocks depending on the size of the memory. That is, the dotted lines indicate blocks that are not specifically shown.

Twenty-four of the blocks in the memory are designated as temporary storage blocks. The temporary storage blocks are designated in the drawings by the labels T1, T2, etc. For convenience of illustration, not all the temporary storage blocks are shown in the drawing. As will be explained, the location of the temporary storable blocks T1 to T24 changes as the memory is operating. It is noted that various standard features of the memory that are not relevant to the present invention are not shown in the Figure and they are not described herein.

The flash memory 100 includes a special storage location (determined by the operating system) for the FAT table and for other control information. The FAT table is used by the operating system to link or map logical addresses to particular files stored in the memory. The FAT table indicates which logical locations in the memory have been assigned to which files. There is also a mapping between logical addresses and physical locations in the memory. This is done by the memory controller.

The SmartMedia specifications require that the memory have twenty-four blocks available for temporary storage. When the memory is new all the blocks are empty and available for storage. Let us assume that initially data is written into all of the blocks in the memory except for the twenty-four blocks designated for temporary storage. At this point the memory would be full. The FAT table would have entries linking all of the available logical addresses (as determined by the size of the memory) to particular files. The memory controller would have a table which shows which logical addresses correspond to which physical addresses. There would still be 24 temporary storage block erased and ready to receive data.

Next, let us assume that the operating system erases a file. Let us assume that this file covers three blocks in the memory. After the operating system erases this file, the FAT table would indicate that these three blocks of logical addresses are no longer assigned to a file. However, in accordance with the SmartMedia specifications, the blocks that had been storing the data would not be erased at this point in time since there are already 24 blocks erased and ready to receive data.

Let us now examine how the SmartMedia specifications indicates that various different situations should be handled: All of these examples assume that the memory has been operating for some time and that at some point the memory was full and that at some other point various files were erased so that the memory now has some empty space. As a first example, let us assume that the host sends a file to the memory, the size of which covers one block. This file would be stored in one of the blocks designated for temporary storage. The controller will assign physical addresses of the temporary storage block to the logical addresses and the file operation would proceed rather quickly. After the file is stored, only twenty three temporary storage blocks remain. However, since the controller assigned new physical addresses to the logical addresses in the stored block, it will know which physical block can be erases to bring the number of available temporary blocks back to twenty four. This erase operation takes a relatively long time, but it is not a problem, since the file sent for storage has already been stored.

Next, let us assume that the host sends a file to the memory, the size of which covers twenty five blocks. In accordance with the SmartMedia specifications, the following operations would take place.

Twenty four of the blocks of data (out of the twenty five) would be stored in the twenty four available temporary storage blocks. There would be no already erased block to accommodate the twenty fifth block of data. Thus, the storage operation could not be completed until the controller locates a block that is not assigned to a file and this block is erased. The located block is erased (a relatively slow operation) and then the twenty fifth block is stored. It is noted that the controller knows which block is no longer assigned to a file since the host is writing to a block of previously used logical addresses, and the previous physical addresses assigned to this block of address can now be erased.

Thus as indicated above, in accordance with the SmartMedia specifications an operation to store a file which has a size equal to twenty five blocks would involve the following steps and time periods:

1) Store twenty four blocks in available temporary storage locations.,

2) Locate a block that can be erased.

3) Erase a block (which takes a relatively long time)

4) Store the twenty fifth block of data

With the present embodiment of the invention, the time required to store a file larger than twenty four blocks is shortened. In this embodiment of the invention, when the memory controller is not in the process of reading or writing a file, it interrogates the FAT table, and erases any blocks of memory that are not assigned to files. That is, it erases blocks that are not being used, even though there are already twenty four blocks erased blocks available for temporary storage. This, in effect, violates the SmartMedia specifications, but it causes no harm in the normal course of operation and it considerably speed up the operation of the system.

Figure 2:
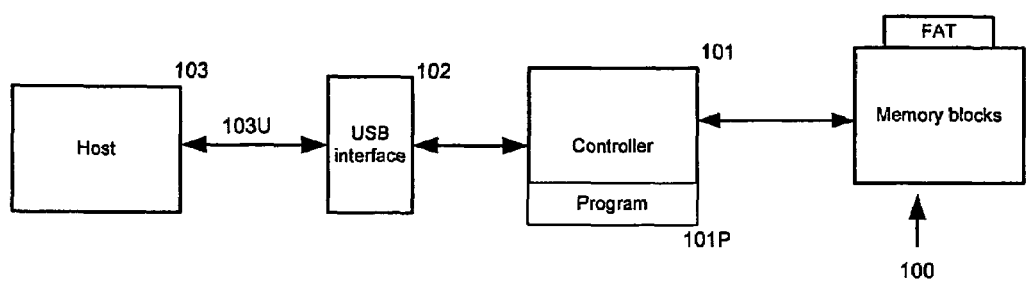
FIG. 2 is a block diagram of an embodiment of the present invention.

FIG. 2 is a block diagram of an embodiment of a memory system which includes the present invention. The system includes a controller 101 and an Universal Serial Bus (USB) interface 102. A computer program 101P controls the operation of the controller 101. A USB connection 103U connects the USB interface 102 a host 103. The host 103 provides data to the memory and reads data from the memory 100.

As is normal, the host 103 provides data and reads data from logical addresses. The FAT table provides the correspondence between logical addresses and files stored in the memory 100. As will be described, the controller 101 under control of program 101P has access to and manipulates the FAT table. The controller 101 includes a microprocessor that can perform operation under control of the program 101P. Naturally, the microprocessor in the controller 101 performs various other normal operation not relevant to the present invention and not discussed herein.

Figure 3A:
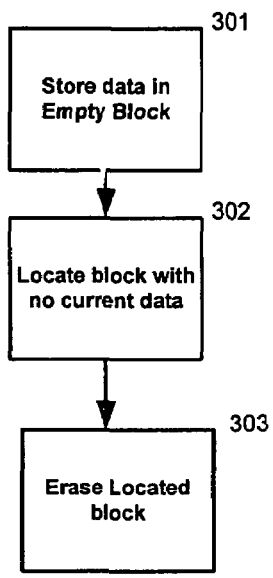
FIGS. 3A, 3B, and 3C are block flow diagrams showing the operation of the preferred embodiment.
Figure 3B:
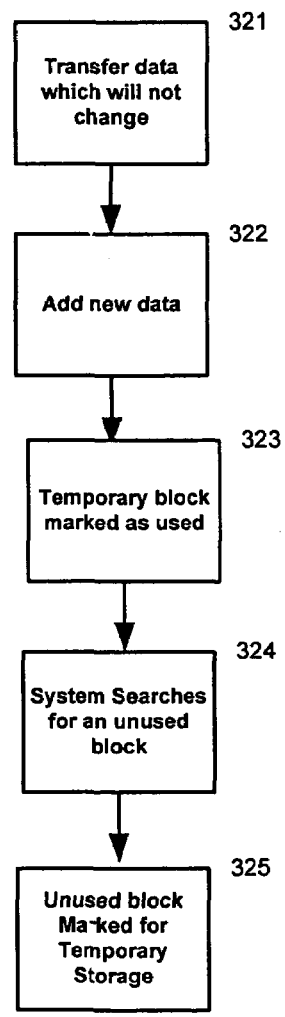
Figure 3C:
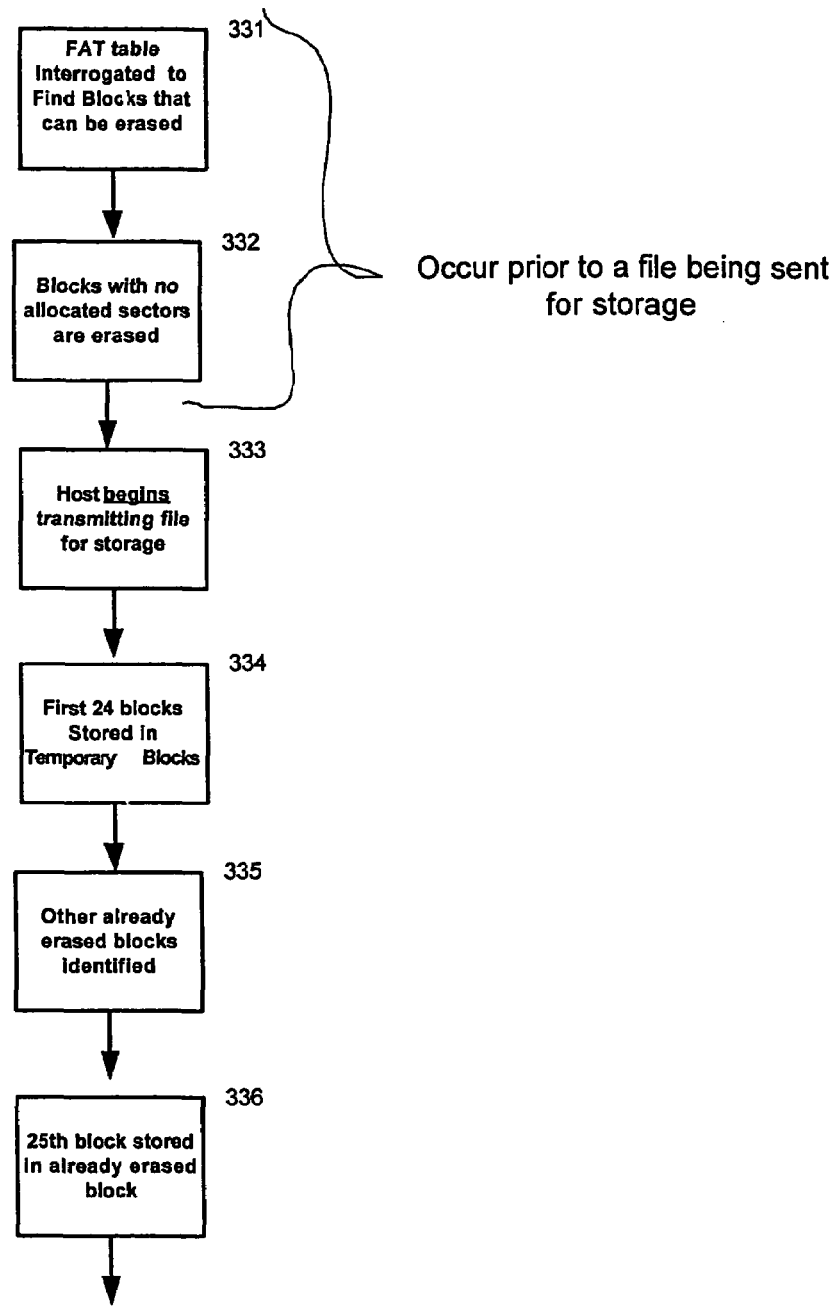
Figure 4:
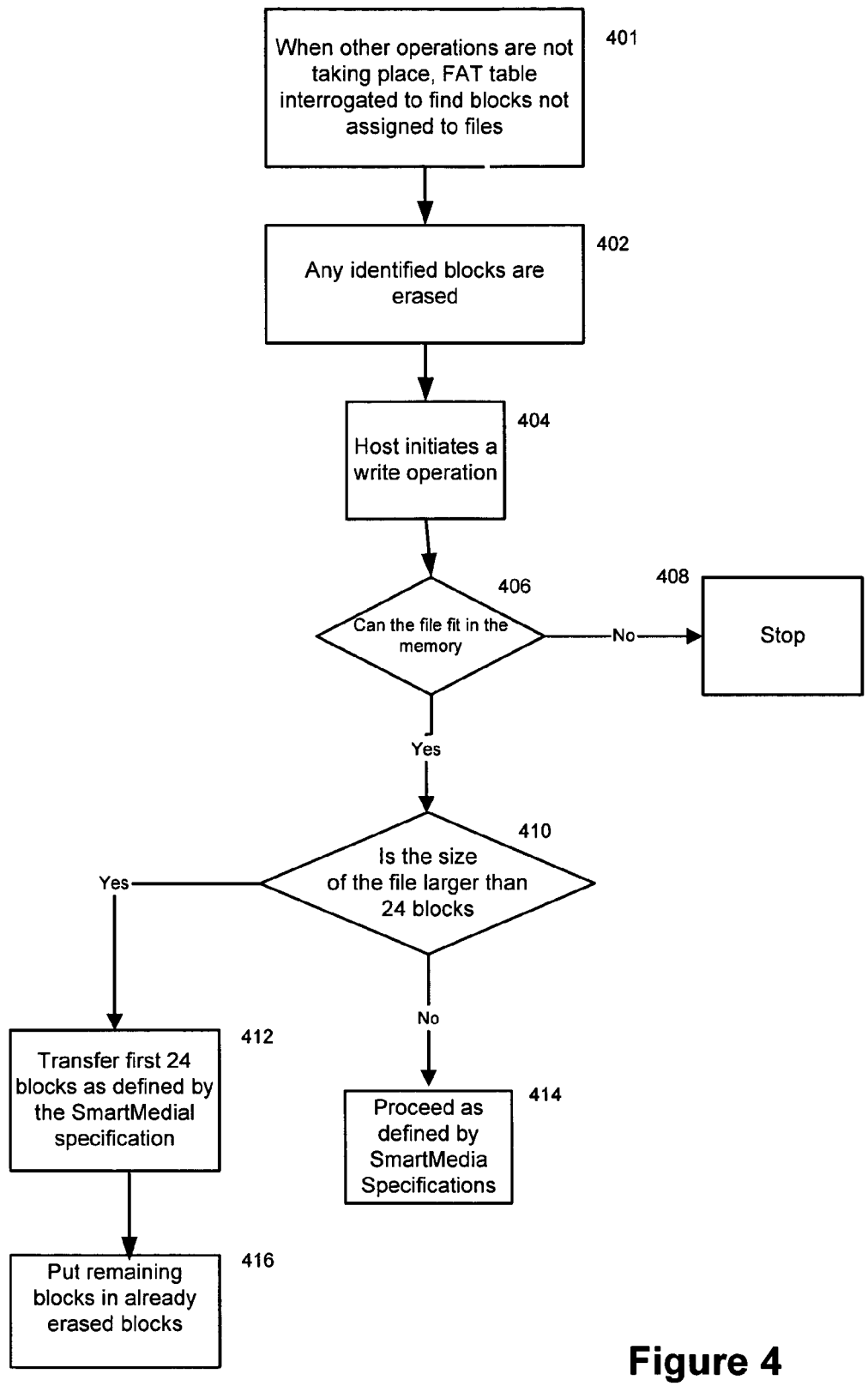
FIG. 4 is an overall flow diagram showing the operation of the system.

Program flow diagrams of the operations that take place with the present embodiment of the invention when various size files are stored in the memory are shown in FIGS. 3A, 3B and 3C. It should be understood that these are merely limited examples to illustrate the operation of the system. An overall program flow diagram of the relevant operation performed by the system is shown in FIG. 4.

It should be understood that the operations shown in the examples illustrated herein occur after the memory has previously stored data, such that all of the blocks have at least had data stored therein one time. The first time that data is written into a block, there is no need for a previous erase operation.

FIG. 3A illustrates a simple write operation. In this example all blocks in the memory have previously stored data therein, but overall the memory is not full. The operation proceeds in two steps. As indicated by rectangle 301, the data is stored in one of the temporary storage locations. That is, the physical address of one of the temporary blocks is assigned to the logical addresses of the new data and the data is stored in this newly assigned block. Next, after the storage operation is complete, the controller erases the block which has the physical address previously assigned to the logical address of the newly stored block. After the now unused block of physical addresses is identified as indicated by rectangle 302 and the block is erased as indicated by rectangle 303. It is noted that the second and third operations take place after the file has been stored in the memory. It is also noted that after the operations are complete there are twenty four temporary stored locations, which are erased and ready to receive data.

FIG. 3B shows what occurs when the host merely want to change the data stored in one sector of the memory. First, as indicated by rectangle 321, the data in the block which will not be changed is transferred to one of the temporary storage blocks. That is, new physical addresses are assigned to the logical addresses of this data and the data is transferred to the new addresses. Next, the new data is written to the temporary storage block and the temporary storage block is marked as a used block as indicated by rectangles 322 and 323. That is, the temporary storage block is no longer a temporary storage block. At this point the data storage operation is complete. Next as indicated by rectangles 324 and 325, the controller erases the block previously assigned to the logical addresses of the new data and that block is marked as a temporary storage block.

FIG. 3C shows the operations that occur when the host sends a file for storage and the size of the file is larger than the size of the twenty four temporary storage blocks. It is assumed that the memory is not full and that it contains sufficient space to store this new file.

FIG. 3C shows two steps that occur prior to the time that the host sends a file to the memory. These steps take place whenever the memory is not busy performing read or write operations. As indicated by rectangle 331, the controller 101 interrogates the FAT table to identify blocks that do not contain data currently assigned to a file. That is, the controller looks for blocks that are not assigned in the FAT and it compares this to the erased area in the memory. If a block is unassigned in the FAT, the controller knows that such a block can be erased. When such a block is located, as indicated by rectangle 332, the block is erased so that it is ready to receive data. This violates the SmartMedia specification; however, during the normal operation of the system it causes no harm. In the event one tries to recover an erased file, this may inhibit the recovery; however, this is not considered to be a normal operation of the system. Of prime importance is the fact that these operations take place prior to a write operation, hence, they do not increase the amount of time needed for a write operation.

When the host sends a file containing twenty five blocks to the memory as indicated by rectangles 333 and 334 (this is what this example illustrates), the first twenty four blocks are stored in the temporary storage locations. The final block of the file is stored in one of the already erased locations. Thus, the store of a file containing twenty five blocks is accomplished without the system having to wait for a block to be erased.

FIG. 4 is an overall flow diagram showing the operation of the system. It is noted that FIGS. 3A to 3C merely showed individual pieces of the operation of the system.

Rectangles 401 and 402, indicate that while other operations are not being performed, the controller 101, under control of the program 101P, interrogates the FAT table to identify blocks that are not assigned to any current files. If any such blocks are identified, the identified blocks are erased and marked as ready to receive data.

As indicated by rectangles 404, 406 and 408, when the host initiates a storage operation, the first determination that is made is whether or not there are enough unassigned blocks in the memory to hold the new file. If this is not the case the memory can not hold the file and the operation is terminated as indicated by block 408. Naturally, it should be understood that some of the operations shown could be performed in various different sequences than the particular sequences shown.

If the memory can hold the file, a determination is made as to whether or not the file is larger than 24 blocks. If the file is smaller than 24 blocks the operation proceeds as specified by the SmartMedia Specifications. If the file is larger than 24 blocks the operations shown by rectangles 412 and 416 take place. That is, the first 24 blocks are stored in the normally open 24 blocks and the remaining blocks are placed in other previously erased blocks. With the present invention, the blocks beyond the initial 24 blocks can be stored without having to wait for any erase operations to take place.

It should be understood that other embodiments of the invention utilize other types of memories other than the specific SmartMedia memory shown in the above embodiment. The invention pertains to all memories that require an erase cycle before writing, as do all flash memory devices.

While the invention has been shown and described with respect to preferred embodiments thereof, it will be understood by those skilled in the art that various changes in form and detail can be made without departing from the spirit and scope of the invention. The scope of the invention is limited only by the appended claims.

I claim:

1. A flash memory subsystem including,
a flash memory which is divided into blocks, a fixed number of said blocks being maintained in erased status and ready to receive data, a File Allocation Table (FAT) being stored in said flash memory,
a memory controller operable to interrogate said FAT and to locate and erase memory blocks which have no sectors therein assigned to active files, said interrogating and erasing taking place during intervals when no files are being read or written to said memory,
whereby files larger that said fixed number of blocks can be written to said memory without waiting for an erase operation to take place.

2. The system recited in claim 1 wherein said memory is a NAND flash memory.

3. The system recited in claim 1 wherein said memory operates consistent with the SmartMedia specifications except for said interrogation and erase operations.

4. A memory system including,
a memory which requires an erase operation prior to a write operation, said memory being divided into blocks, a fixed number of said blocks being maintained in erased status and ready to receive data, a File Allocation Table (FAT) being stored in said memory,
a memory controller operable to interrogate said FAT and to locate and erase memory blocks which have no sectors therein assigned to active files, said interrogating and erasing taking place during intervals when no files are being read or written to said memory,
whereby files larger that said fixed number of blocks can be written to said memory without waiting for an erase operation to take place.

5. The system recited in claim 4 wherein said memory is a flash memory.

6. The system recited in claim 4 wherein said memory is a NAND flash memory.

7. The system recited in claim 4 wherein said memory operates consistent with the SmartMedia specifications except for said interrogation and erase operations.

8. The system recited in claim 6 wherein said memory operates consistent with the SmartMedia specifications except for said interrogation and erase operations.

9. The system recited in claim 4 wherein said memory has at least twenty four previously erased blocks, ready for a write operation.

10. A method of operating a memory which is divided into blocks and which requires that each particular block be erased prior to writing into each particular block, said memory having a file allocation table (FAT) stored therein, said method including the steps of:
interrogating said FAT when no read or write operations are taking place to identify blocks not assigned to current files,
erasing identified blocks when no read or write operation are taking place,
whereby large files can be stored in said memory without waiting for an erase operation to take place.

11. The method recited in claim 10 wherein said memory is a flash memory.

12. The method recited in claim 10 wherein said memory is a NAND flash memory.

13. The system recited in claim 10 wherein said memory operates consistent with the SmartMedia specifications except for said interrogation and erase operations.

14. A memory subsystem including:
a memory which is divided into blocks and which requires that each particular block be erased prior to writing into each particular block, said memory having a file allocation table (FAT) stored therein,
means for interrogating said FAT when no read or write operations are taking place to identify blocks not assigned to current files,
means for erasing identified blocks when no read or write operation are taking place,
whereby large files can be stored in said memory without waiting for an erase operation to take place.

15. The method recited in claim 14 wherein said memory is a flash memory.

16. The method recited in claim 14 wherein said memory is a NAND flash memory.

17. A system including a host computer in combination with the memory subsystem recited in claim 14 connected to said host by a Universal Serial Bus.

18. The memory system recited in claim 4 wherein said memory controller includes a Universal Serial Bus interface.

19. A system including a host computer in combination with the memory system recited in claim 18, said host being connected to said memory system by a a Universal Serial Bus.

20. The flash memory subsystem recited in claim 1 wherein said memory controller includes a Universal Serial Bus interface.

* * * * *

UNITED STATES PATENT AND TRADEMARK OFFICE
CERTIFICATE OF CORRECTION

PATENT NO. : 6,967,869 B1
APPLICATION NO. : 10/898501
DATED : November 22, 2005
INVENTOR(S) : Stephen Henry Kolokowsky It is certified that error appears in the above-identified patent and that said Letters Patent is hereby corrected as shown below:

Col. 7, line 26, Claim 1: replace "that" with --than--

Col. 7, line 45, Claim 4: replace "that" with --than--

Signed and Sealed this

Sixteenth Day of June, 2009

JOHN DOLL
*Acting Director of the United States Patent and Trademark Office*